R. MOORE & P. D. BRUNER.
Fruit-Drier.
No. 213,233. Patented Mar. 11, 1879.
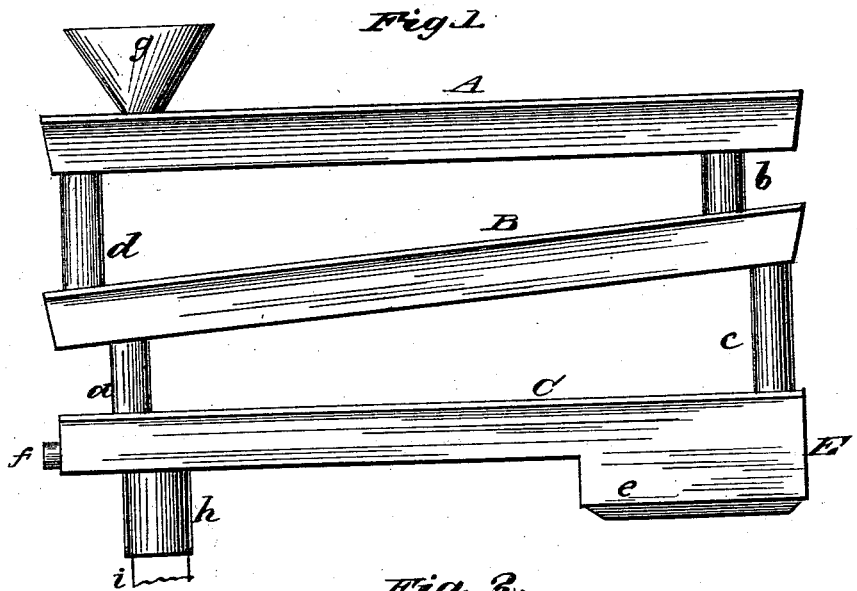
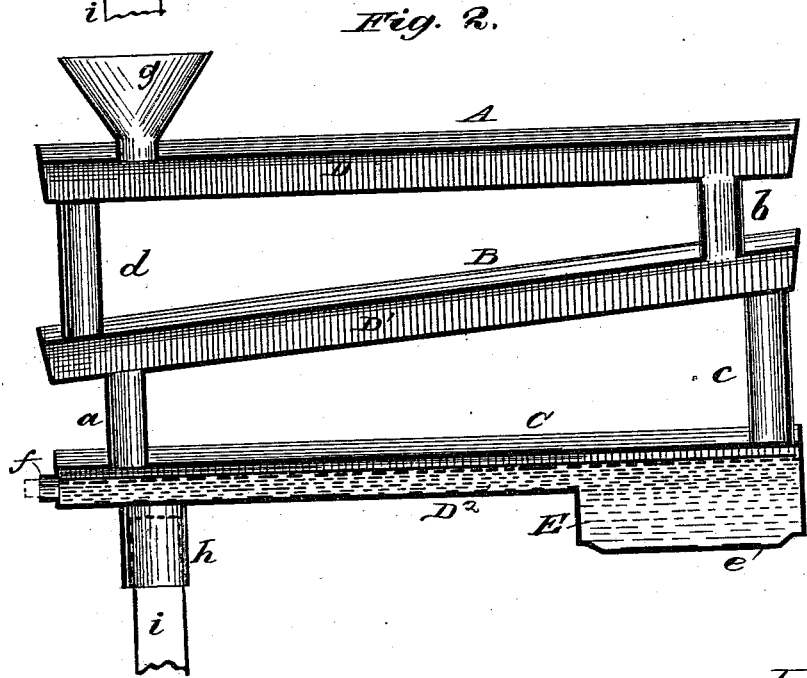

UNITED STATES PATENT OFFICE.

RUFUS MOORE AND PHILETUS D. BRUNER, OF KINGSVILLE, ONTARIO, CANADA, ASSIGNORS TO SAID MOORE, OF SAME PLACE.

IMPROVEMENT IN FRUIT-DRIERS.

Specification forming part of Letters Patent No. 213,233, dated March 11, 1879; application filed September 23, 1878.

*To all whom it may concern:*

Be it known that we, RUFUS MOORE and PHILETUS D. BRUNER, of Kingsville, in the Province of Ontario and Dominion of Canada, have invented certain new and useful Improvements in Fruit-Driers; and we do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of my improved fruit-drier, and Fig. 2 is a vertical longitudinal section thereof.

The same part in the two figures is denoted by the same letter.

This invention appertains to certain improvements in that class of devices known as "fruit-driers;" and it consists in the construction and arrangement of parts of a drier in such manner that it shall be adapted for use in connection with an ordinary cook or other stove.

The nature of this invention consists in the employment of a number of fruit-holding pans or trays, arranged one above the other, with suitable spaces between them, and each pan having a water-holding or steam chamber, connected together by short tubes or pipes at their ends, the lower pan being provided with a downward-projecting boiler, and with a socket for the insertion of a removable standard or support, substantially as hereinafter more fully set forth.

In the drawings, A B C represent a number of fruit-holding pans, arranged one above the other, and, preferably, of an oblong or rectangular form. Constructed with and upon the lower sides of these pans are correspondingly-shaped water-holding or steam chambers $D$ $D^1$ $D^2$, connected together by short tubes or pipes $a$ $b$, for the passage of the steam from one chamber to the other, and supported, one upon the other, by standards $c$ $d$, alternating with the tubes $a$ $b$, as shown more clearly in Fig. 2.

In connection with the lower pan or chamber is constructed, or otherwise attached thereto, a downwardly-projecting boiler, E, suitably bottomed, as at $e$, for immediate contact with the fire in a stove, upon which this device is adapted for use.

Opposite to and in a line with the boiler E is a cylindrical socket, $h$, soldered or otherwise secured upon the bottom of the lowermost receptacle, $D^2$, and adapted for the insertion of a brace or support, $i$, to prevent the apparatus from tilting when the boiler E is inserted into the fire-hole or opening of the stove.

$f$ is a tap supplied to the lower chamber, $D^2$, and $g$ is a funnel-shaped steam-exit provided to the upper chamber, D. This hopper or funnel also serves to fill the boiler E with water whenever required. These chambers are arranged in an inclined position for carrying off the condensed steam or water.

The fruit to be dried is placed in the pans A B C, and, as soon as the water in the boiler E is generated into steam, the latter passes up under, and into contact with, the bottoms of the pans, heating the same when the process of drying the fruit begins, the fruit remaining in the pans until the same (the fruit) is properly dried.

This drier is extremely simple, easily managed, cheaply constructed, and may be used upon any ordinary stove.

Having thus fully described my invention, I claim and desire to secure by Letters Patent of the United States—

The improved fruit-drier herein shown and described, consisting of the pans A B C, provided with the receptacles $D$ $D^1$ $D^2$, connected by vertical pipes $a$ $b$ and standards $c$ $d$, the upper receptacle, D, being provided with the funnel $g$, and the lower, $D^2$, with the depending or downward-projecting boiler E and socket $h$, whereby the drier is adapted for use on an ordinary stove, substantially as and for the purpose hereinbefore shown and specified.

In testimony that we claim the foregoing as our own we have hereto affixed our signatures in presence of two witnesses.

RUFUS MOORE.
PHILETUS D. BRUNER.

Witnesses:
LEWIS WIGLE,
J. ENOCH JOHNSON.